United States Patent
Linzer

(10) Patent No.: US 8,446,962 B2
(45) Date of Patent: *May 21, 2013

(54) COMPRESSED VIDEO FORMAT WITH PARTIAL PICTURE REPRESENTATION

(75) Inventor: Elliot N. Linzer, Suffern, NY (US)

(73) Assignee: LSI Corporation, San Jose, CA (US)

( * ) Notice: Subject to any disclaimer, the term of this patent is extended or adjusted under 35 U.S.C. 154(b) by 594 days.

This patent is subject to a terminal disclaimer.

(21) Appl. No.: 12/633,094

(22) Filed: Dec. 8, 2009

(65) Prior Publication Data

US 2010/0086059 A1 Apr. 8, 2010

Related U.S. Application Data

(62) Division of application No. 10/277,698, filed on Oct. 22, 2002, now Pat. No. 7,660,356.

(60) Provisional application No. 60/415,943, filed on Oct. 2, 2002.

(51) Int. Cl.
*H04N 7/12* (2006.01)

(52) U.S. Cl.
USPC ............................... 375/240.25; 375/240.26

(58) Field of Classification Search
USPC ....................................... 375/240.25, 240.26
See application file for complete search history.

(56) References Cited

U.S. PATENT DOCUMENTS

| 5,353,065 A | 10/1994 | Katsumata et al. | 348/556 |
|---|---|---|---|
| 5,737,026 A | 4/1998 | Lu et al. | 348/473 |
| 5,808,689 A | 9/1998 | Small | 348/476 |
| 6,300,980 B1 | 10/2001 | McGraw et al. | 348/552 |
| 6,400,767 B1 | 6/2002 | Nuber et al. | 375/240.26 |
| 6,408,096 B2 | 6/2002 | Tan | 382/232 |
| 6,463,102 B1 | 10/2002 | Linzer | 375/240.29 |
| 6,477,267 B1 | 11/2002 | Richards | 382/154 |
| 2001/0017892 A1 | 8/2001 | Barton et al. | 375/240.26 |
| 2002/0196853 A1 | 12/2002 | Liang et al. | 375/240.12 |
| 2003/0228127 A1* | 12/2003 | Buxton | 386/46 |
| 2004/0150540 A1 | 8/2004 | Winger | 341/107 |

OTHER PUBLICATIONS

"CCIR Rec. 601-2: Encoding Parameters of Digital Televison for Studios", 1990, pp. 1-2.
"Joint Video Team (JVT) of ISO/IEC MPEG and ITU-T VCEG", Sep. 19, 2001, pp. 1-200.

* cited by examiner

*Primary Examiner* — Sath V Perungavoor
*Assistant Examiner* — Jeffery Williams
(74) *Attorney, Agent, or Firm* — Christopher P. Maiorana, PC

(57) ABSTRACT

An encoder comprising a first circuit and a second circuit. The first circuit may be configured to (i) generate a cropped video signal in response to separating a video signal and (ii) generate overscan information describing a shape of an overscan region. The video signal conveys an image having a picture region containing image information and the overscan region. The cropped video signal conveys the picture region. The second circuit may be configured to generate a digital video bit-stream in response to compressing said cropped video signal. The overscan region is absent from the digital video bit-stream as transmitted from the encoder.

24 Claims, 3 Drawing Sheets

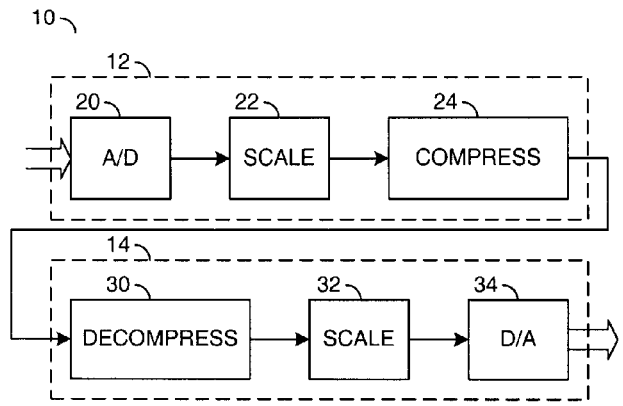
(CONVENTIONAL)
FIG. 1

COMPRESSED VIDEO FORMAT WITH PARTIAL PICTURE REPRESENTATION

This is a divisional of U.S. application Ser. No. 10/277,698, filed Oct. 22, 2002 now U.S. Pat. No. 7,660,356, which claims the benefit of U.S. Provisional Application No. 60/415,943, filed Oct. 2, 2002, and which are hereby incorporated by reference in their entirety.

FIELD OF THE INVENTION

The present invention relates to video compression coding/decoding generally and, more particularly, to a method and/or architecture for implementing a compressed video format with partial picture representation.

BACKGROUND OF THE INVENTION

Compression of digital video data is needed for many applications. Transmission over limited bandwidth channels such as direct broadcast satellite (DBS) and storage on optical media (i.e., DVD, CD, etc.) are typical examples of compressed data. In order to achieve efficient compression, complex computationally intensive processes are used for encoding (or compressing) and decoding (or decompressing) digital video signals. For example, even though MPEG-2 is known as a very efficient method for compressing video, more efficient compression standards such as H.264 are being developed. See, for example, document JVT-E022d7 titled "Editor's Proposed Draft Text Modifications for Joint Video Specification (IUT-T Rec. H.264 ISO/IEC 14496-10 AVC), Draft 7" published 19 Sep. 2002 by the Joint Video Team (JVT) of ISO/IEC MPEG and ITU-T VCEG, Berlin, Germany, which is hereby incorporated by reference in its entirety.

Referring to FIG. 1, a conventional coding/decoding system 10 is shown. The system 10 comprises an encoder 12 and a decoder 14. The encoder 12 comprises an analog to digital converter 20, a scaler 22 and a compression circuit 24. The decoder 14 comprises a decompression circuit 30, a scaler circuit 32 and a digital to analog converter circuit 34.

The encoder 12 scales an entire image before compression. The decoder 14 scales the image after decompression. For example, the A/D converter 20 generates an image having 720×480 pixels (e.g., in International Radio Consultative Committee (CCIR) format). The encoder 12 scales the image horizontally to 544×480 pixels (i.e., a factor of about 75%). The decoder 14 receives the image and rescales to 720×480 pixels before generating a video signal via the converter 34. In another example, the encoder 12 also scales the image to 544×480, but the decoder 14 scales the image to 1920×1080 pixels before the D/A conversion to display the image on a high definition (HDTV) monitor (not shown).

Another apparatus, disclosed in U.S. Pat. No. 6,463,102, modifies one or more edges of an image prior to encoding to make the encoding more efficient. An edge processor alters the image by converting some of the pixels at the image edges to black, blurring the image edges, and/or copying rows or columns of pixels multiple times on the image edges. Through the edge processing, the modified image retains the same size as the original image. The apparatus then encodes and transmits the modified image.

It would be desirable to provide a method and/or apparatus for improving encoding/decoding efficiency by not encoding/decoding an overscan portion from an encode/decode bit-stream.

SUMMARY OF THE INVENTION

One aspect of the present invention concerns a method for decoding a digital video bit-stream comprising the steps of (A) receiving the digital video bit-stream having (i) a first portion containing image information and (ii) a second portion containing overscan information and (B) extracting the overscan information from the video bit-stream. The overscan information describes a shape of an overscan region absent from the digital video bit-stream.

Another aspect of the present invention concerns a method for encoding a digital video bit-stream comprising the steps of (A) placing information into the digital video bit-stream having (i) an overscan region in an image and (ii) a picture region in the image, wherein the overscan region is absent from the digital video bit-stream and the picture region is explicitly represented in the digital video bit-stream and (B) presenting the digital video bit-stream containing information to reconstruct at least one image.

The objects, features and advantages of the present invention include providing a compressed video format that may (i) implement partial picture representation to improve encoding/decoding efficiency, (ii) be implemented without transmitting a large part of the image for intended displays having a large overscan area, (iii) use more bits for the visible part of the image, and/or (iv) use less compression for the visible part of an image.

BRIEF DESCRIPTION OF THE DRAWINGS

These and other objects, features and advantages of the present invention will be apparent from the following detailed description and the appended claims and drawings in which:

FIG. 1 is a diagram of a conventional coding/decoding system;

DETAILED DESCRIPTION OF THE PREFERRED EMBODIMENTS

Figure 2:
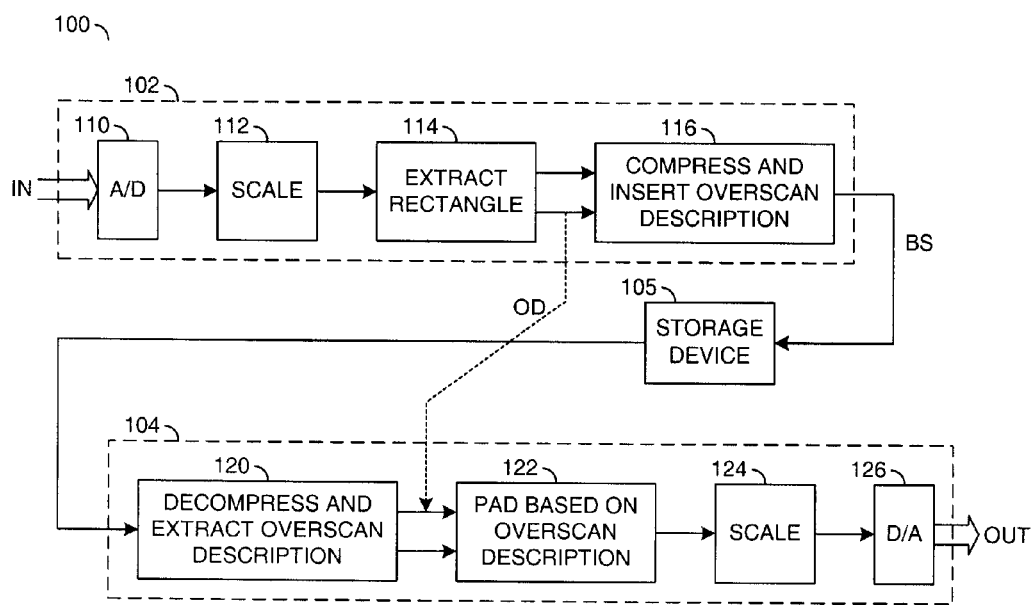
FIG. 2 is a diagram of coding/decoding system in accordance with a preferred embodiment of the present invention.

The present invention provides a method and/or apparatus for improving encoding/decoding efficiency in overscanned images. Compared with conventional approaches that code an entire image, the present invention may be implemented to code only a sub-rectangle (or portion or region) of an image. Information either (i) in the bit-stream (e.g., in-band) or (ii) external to the bit-stream (e.g., out-of-band) may be transmitted to describe a relationship of the sub-rectangle to the entire image. In one example, a sub-rectangle of size 656 pixels by 448 pixels may be sent. Other information may be provided to indicate that the full image resolution may be 720×480 pixels. The syntax may specifically indicate to fill the full image (e.g., 720×480 pixels) by centering the coded (or picture) 656×448 pixels a distance of 16 pixels from the top, bottom, left and right from the edges of the 720×480 pixel image. The particular distances may be represented (or encoded) in the bit-stream and may be different for each edge with one or more overscan parameters.

A decoder connected to a display with overscan (e.g., a commercial television) may pad the smaller picture image (or region) with a padded (or overscan) region to obtain the full sized image (or frame). The padded image may be a reconstructed image that has been extended by the overscan parameters. The decoder may optionally scale the padded image to a different resolution. The result may be sent to a digital to analog (D/A) converter. In cases where some of the non-coded part of the image may be inside the underscan (e.g., viewable) area, the image may be extended to avoid making the non-coded areas annoying. In one example, the outermost rows or columns of the coded (or picture) region may be copied into the padded (or overscan) region to provide the padding. A decoder connected to a display without overscan (e.g., a window on a computer display) may display the smaller picture image.

With overscan, a video signal, whether analog or digital, may have both a viewable region and an overscan region (to be described in more detail in connection with FIGS. 3 and 4). The overscan region may contain part of the picture that is not normally viewed. For example, a CCIR-601 bit-stream is a standard for representing uncompressed digital video. See, for example, CCIR Rec. 601-2, "Encoding Parameters of Digital Television for Studios" (1990), published by the International Telecommunication Union, Geneva, Switzerland, which is hereby incorporated by reference in its entirety. The active region of a CCIR-601 bit-stream may be 720 pixels wide and 486 rows high. After being converted to an analog signal and displayed on a typical monitor, only about 648 pixels wide by about 440 lines may be visible. The exact range of the visible region generally depends on the characteristics of the particular display device. Professional video monitors typically have an under-scan feature. When the under-scan feature is activated, the image may be shrunk so the overscan region may be seen.

In a mixed display environment, a signal may be compressed and later decompressed and displayed on various monitors. In one example, a movie may be compressed and placed on an optical disk (e.g., DVD, CD, etc.). The optical disk may then be played back either on a consumer television set or a computer. When played back on some monitors, such as a consumer television, the overscan region may not be viewable. When played back on a computer, the entire decoded image is typically displayed in a window on the computer monitor or on the entire monitor without any overscan.

Referring to FIG. 2, a system 100 is shown in accordance with a preferred embodiment of the present invention. The system 100 generally comprises an encoder 102, a decoder 104 and an optional storage device 105. The encoder 102 generally receives an input signal (e.g., IN). The decoder generally presents an output signal (e.g., OUT). The encoder 102 generally presents a bit-stream (e.g., BS) to the decoder 104 and/or the storage device 105 across a medium. The storage device 105 may also present the bit-stream BS to the decoder 104. The system 100 may be configured such that the encoder 102 presents an overscan description (e.g., OD) to the decoder 104 outside the bit-stream BS.

The encoder 102 generally comprises a block (or circuit) 110, a block (or circuit) 112, a block (or circuit) 114 and a block (or circuit) 116. The various blocks (e.g., 110, 112, 114 and 116) of the decoder 102 may each, either individually or collectively, add data and/or otherwise modify information ultimately carried by the bit-stream BS. The block 110 may be implemented as an analog to digital converter. The analog to digital converter block 110 may convert the incoming video signal IN into a digitized or uncompressed video signal. The video signal IN may convey images or frames containing the picture region normally viewed and the overscan region normally not viewed.

The block 112 may be implemented as a scaler. The scaler block 112 may scale the digitized video signal to generate a scaled uncompressed video signal. The scaled uncompressed video signal may also convey the picture region and the overscan region. Horizontal and vertical scale factors used in the scaling operation may be smaller than unity, unity, or greater than unity.

The block 114 may be implemented to extract a rectangle (e.g., a portion of the image containing image information) from the scaled uncompressed video signal while in a first mode. The rectangle may represent a picture (or coded) region of the original image that may be eventually displayed. A description of the extracted rectangle may include image information. The block 114 may also separate the image into the picture region and an overscan (or padded) region. The extraction block 114 generally transforms the scaled uncompressed video signal into a cropped video signal. The extraction block 114 may also generate the overscan description OD while in one (e.g., first) mode. While in another (e.g., second) mode, the extraction block 114 may pass the scaled uncompressed video signal through to the block 116 unchanged.

The block 116 may be implemented as a compression circuit. The compression block 116 may compress the cropped video signal into the digital video bit-stream BS. The compression block 116 may also multiplex or insert the overscan information into the bit-stream BS for presentation to the decoder 104, if the overscan information is available (e.g., the first mode). The compression block 116 may compress the full frames (or images) of the video signal while in the second mode. The image information generally contains information about the image that may be explicitly represented in the bit-stream BS. The overscan information generally contains information about the overscan region. Therefore the overscan region may be absent from, or not explicitly represented in the bit-stream BS.

The decoder 104 generally comprises a block (or circuit) 120, a block (or circuit) 122, a block (or circuit) 124 and a block (or circuit) 126. The block 120 may be implemented as a decompression circuit that may extract the overscan information and the picture region conveyed by the bit-stream BS. The block 120 may also decompress the picture region to generate a decompressed video signal. The block 122 may pad or otherwise modify the decompressed video signal images based on the overscan information. A resulting padded video signal may convey the reconstructed picture region and a newly generated overscan region. The block 124 may be implemented as a scaler circuit configured to adjust the size of the image contained in the padded video signal. The scaler block 124 may generate a digital video signal. The block 126 may be implemented as a digital to analog converter circuit to convert the digital video signal into an analog video signal.

In one example, the decoder 104 may pad the extracted rectangle based on the information in the bit-stream BS after decoding the images. Typically, the region not in the extracted rectangle will correspond to the overscan region. In another example, the decoder 104 may simply ignore the overscan description in the bit-stream BS. For example, if the decoder 104 is connected to a television (not shown) with overscan, the decoder 104 may pad the extracted picture region. If the decoder 104 is connected to a computer (not shown), the decoder 104 may ignore the overscan information.

In one example, after scaling each image or frame to 544×480 pixels, the encoder 102 may extract a window around the picture region having a size of 496×432 pixels. The decoder 104 may pad the reconstructed image to 544×480 pixels before scaling. Since the same up-sampling ratio may be used for the padding, the padding does not generally introduce loss of image fidelity. For a display with overscan, there may be no reduction in the quality of the viewed image. Since the bit-stream BS of the present example contains information on how to reconstruct images of size 496×432 pixels, 18% fewer pixels may be needed as compared with a conventional bit-stream. Fewer pixels allow either a lower bit-rate may be used for the bit-stream BS and/or fewer compression artifacts may be noticeable because more bits are used per pixel that is sent. The order of scaling and/or extracting at the encoder 102 and/or padding and scaling at the decoder 104 may be modified to meet the design criteria of a particular implementation. Also, scaling at the encoder 102 or decoder 104 may be skipped completely if appropriate.

Figure 3:
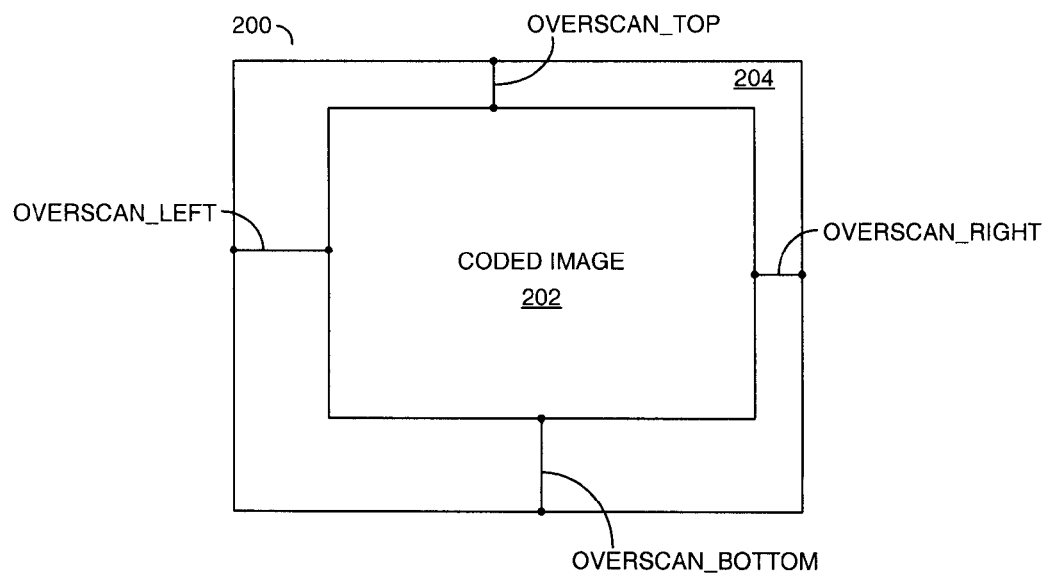
FIG. 3 is a diagram of an image illustrating overscan information.

Referring to FIG. 3, an example of an image (or frame) 200 is shown. The image 200 generally comprises a coded image (or picture region) 202 and an overscan image (or overscan region) 204. The image 200 may be referred to as a padded image. Overscan information (or overscan parameters) may be represented as four integers including (i) OVERSCAN_LEFT (e.g., the number of pixel columns to the left of the coded image that are not coded), (ii) OVERSCAN_RIGHT (e.g., the number of pixel columns to the right of the coded image that are not coded), (iii) OVERSCAN_TOP (e.g., the number of pixel rows on top of the coded image that are not coded), and (iv) OVERSCAN_BOTTOM (e.g., the number of pixel rows on the bottom of the coded image that are not coded).

In another embodiment, the four overscan parameters may define an area of the overscan region. For example, the OVERSCAN_LEFT, OVERSCAN_RIGHT, OVERSCAN_TOP and OVERSCAN_BOTTOM parameters may determine heights and widths of a left portion, a right portion, a top portion and a bottom portion of the overscan region, respectively. The overscan parameters may also define a shape of the overscan region. For example, the overscan parameters may provide an offset of the outer edges of the overscan region as measured from each edge of the pattern region. In another embodiment, the inner edges of the overscan region may be measured relative to the outer edges of the full image or frame. Other overscan descriptions may be implemented to meet the design criteria of a particular application.

Referring to TABLE 1, a way of sending the overscan parameters from the encoder 102 to the decoder 104 may be as part of the Video Usability Information (VUI) header in H.264. The syntax is shown in the following TABLE 1:

TABLE 1

| OVERSCAN_INFO | u(1) |
|---|---|
| IF(OVERSCAN_INFO) { | |
| OVERSCAN_LEFT | ue(v) |
| OVERSCAN_RIGHT | ue(v) |
| OVERSCAN_TOP | ue(v) |
| OVERSCAN_BOTTOM | ue(v) |
| } | |

In TABLE 1, the same basic terminology is used as in the 1-1.264 specification. For example, (i) u(1) may represent one overscan parameter as an unsigned integer of length 1 bit and (ii) ue(v) may represent another overscan parameter as an unsigned integer Exp-Golumb-coded syntax element with left bit first. If a flag (e.g., OVERSCAN INFO) is set to 0, the parameters OVERSCAN_LEFT, OVERSCAN_RIGHT, OVERSCAN_TOP, and/or OVERSCAN_BOTTOM may not be sent and instead all may take on the default value of zero. Another way of sending the overscan parameters may be as part of pan-and-scan fields mentioned in H.264. In one example, the overscan parameters may be transmitted separately from the bit-stream BS.

Padding of the coded image 202 within the overscan image 204 may be implemented in a number of ways. In one example, each image may be decoded into a buffer that has space for the overscan area or region, without necessarily filling the overscan area with any particular data. The buffering method may be simple and may work acceptably if the overscan region is not visible when the reconstructed video signal is displayed.

Figure 4:
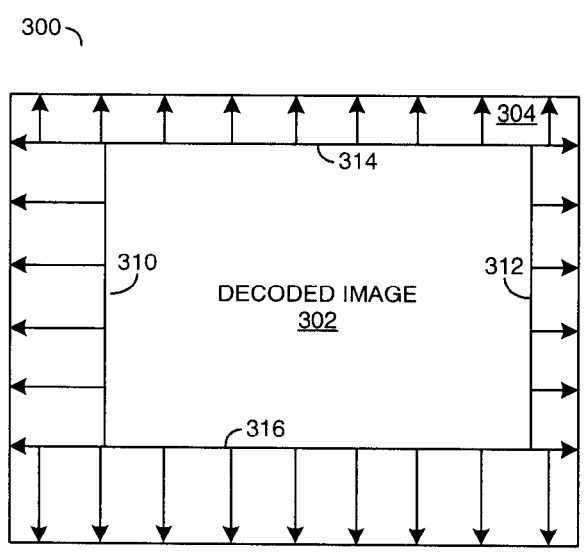
FIG. 4 is a diagram of an image illustrating a decoded image in accordance with a preferred embodiment of the present invention.

Referring to FIG. 4, an image 300 is shown. The image 300 generally comprises a decoded image (or region or picture region) 302 and an overscan image (or region) 304. The image 300 may be referred to as a padded image (or frame). The left-most column 310 of the picture region 302 may be copied to the left, the right-most column 312 of the picture region 302 may be copied to the right, the top-most row 314 of the picture region 302 may be copied to the top, and the bottom-most row 316 of the picture region 304 may be copied to the bottom. For interlaced video, the copying may be done either on each frame or on each field. More generally, any method may be used that uses pixel values within the picture region to fill the edge of the image.

Padding the decoded picture or image may be used when some of the (e.g., nominal) overscan region 304 will or might appear on the screen. Padding the coded image may be performed if the display is not well calibrated, or if the encoder 102 is aggressive in setting the overscan parameters. In one example, such as for a CCIR-601 signal, about 648×440 pixels out of 720×480 pixels are in the picture region 302. The encoder 202 may be arranged to encode only 640×432 pixels and set OVERSCAN_LEFT=OVERSCAN_RIGHT=40 and OVERSCAN_TOP=OVERSCAN_BOTTOM=24. A few non-coded rows and columns may appear on the display. Since the non-coded pixels are on the edge of the screen and similar to nearby pixels, the non-coded pixels may not be annoying to the viewer.

Figure 5:
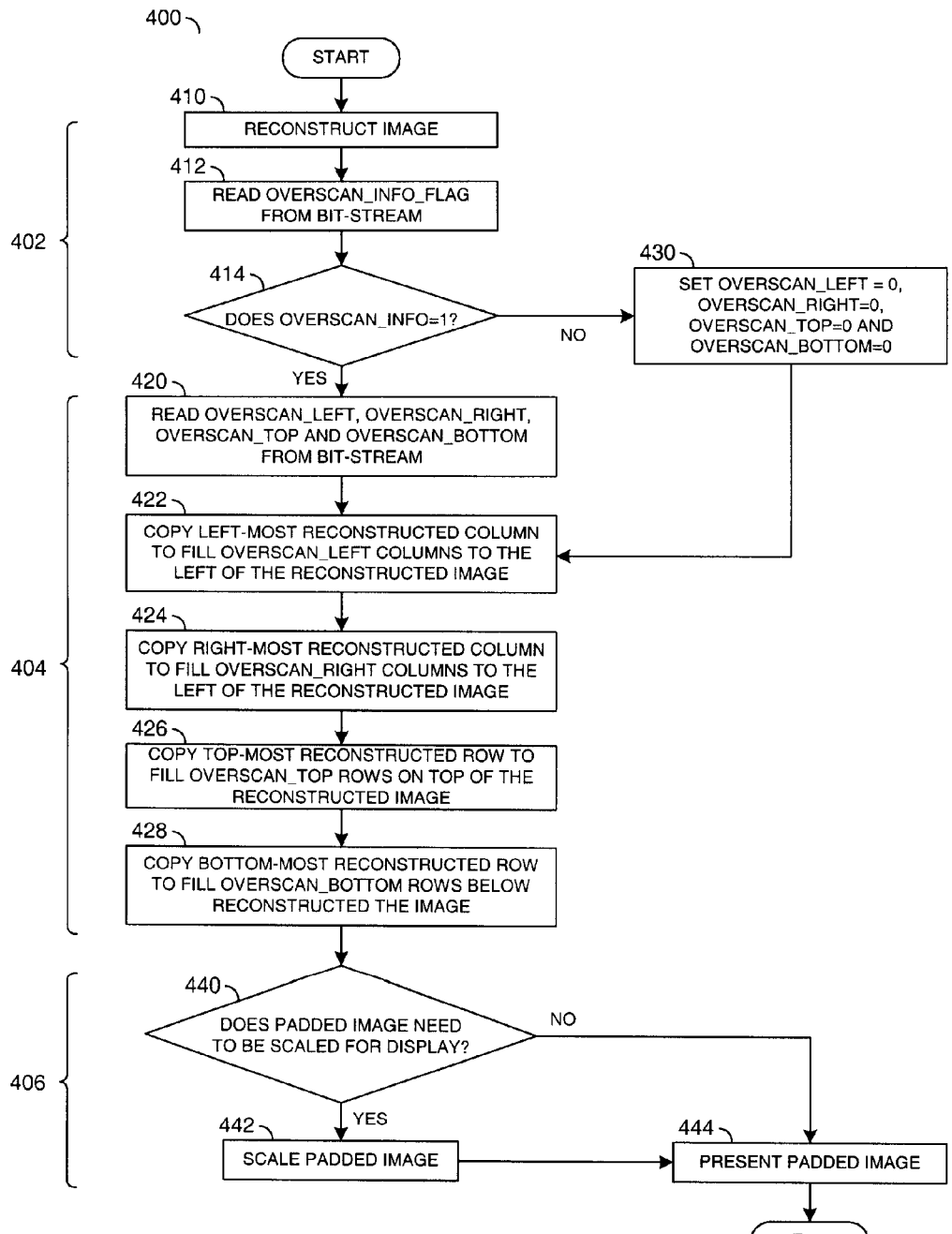
FIG. 5 is a flow diagram of an operation of an embodiment of the present invention.

Referring to FIG. 5, a flow diagram of a process 400 in accordance with the present invention is shown. The process 400 generally comprises an input portion 402, a processing portion 404 and an output portion 406. The input portion 402 generally comprises a state 410, a state 412 and a decision state 414. The state 410 generally reconstructs an input image. The state 412 generally reads an overscan flag (e.g., OVERSCAN-INFO) as received in the bit-stream BS or the overscan description OD. The decision state 414 generally determines if the flag OVERSCAN-INFO is set (e.g., 1) or not set (e.g., 0).

The processing portion 404 generally comprises a state 420, a state 422, a state 424, a state 426, a state 428 and a state 430. If the decision state 414 determines that the flag OVERSCAN-INFO is equal to 1, the process 400 executes the state 420, the state 422, the state 424, the state 426 and the state 428. The particular order of the state 422, the state 424, the state 426 and the state 428 may be modified to meet the design criteria of a particular implementation. The state 420 reads the various overscan parameters (e.g., OVERSCAN_LEFT, OVERSCAN_RIGHT, OVERSCAN_TOP, and OVERSCAN_BOTTOM) from the bit-stream BS or overscan description OD. While in the state 422, the process 400 copies the left-most reconstructive column to fill the columns defined by the parameter OVERSCAN_LEFT to the left of the reconstructive image. Similarly, in the state 424, the process 400 copies the right-most reconstructive column to fill the columns defined by the parameter OVERSCAN_RIGHT to the right of the reconstructive image. In the state 426, the process 400 generally copies the top-most reconstructive row to fill the rows defined by the parameter OVERSCAN_TOP on top of the reconstructed image. Similarly, in the state 428, the process 400 copies the bottom-most reconstructive row to fill the rows defined by the parameter OVERSCAN_BOTTOM below the reconstructed image.

If the decision state 414 determines that the flag OVERSCAN INFO is not set, the process 400 may move to the state 430. In the state 430, the process 400 generally sets the overscan parameters to zero. The process 400 may then move to the state 422.

The output portion 406 generally comprises a decision state 440, a state 442 and a state 444. After the processing section 404, the decision state 440 determines if the padded image needs to be scaled prior to being presented for display by the state 444. The padded image may be the reconstructed image that has been extended by (OVERSCAN_LEFT+ OVERSCAN_RIGHT) columns and (OVERSCAN_TOP+ OVERSCAN_BOTTOM) rows. If the image does need scaling, the process 400 moves to the state 442. In the state 442, the process 400 scales the padded image and then displays the padded image in the state 444. If the decision state 440 determines that the padded image does not need scaling, the process 400 may move to the state 444 to display the image.

The function performed by the flow diagram of FIG. 5 may be implemented using a conventional general purpose digital computer programmed according to the teachings of the present specification, as will be apparent to those skilled in the relevant art(s). Appropriate software coding may readily be prepared by skilled programmers based on the teachings of the present disclosure, as will also be apparent to those skilled in the relevant art(s).

The present invention may also be implemented by the preparation of custom silicon chips, ASICs, FPGAs, or by interconnecting an appropriate network of conventional component circuits, as is described herein, modifications of which will be readily apparent to those skilled in the art(s).

The present invention thus may also include a computer product which may be a storage medium including instructions which may be used to program a computer to perform a process in accordance with the present invention. The storage medium may include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An encoder comprising:
a first circuit configured to (i) generate a cropped video signal in response to an input video signal and (ii) generate one or more overscan parameters describing one or more dimensions of an overscan region, wherein said cropped video signal conveys a picture region extracted from an image in said input video signal; and
a second circuit configured to generate a digital video bit-stream in response to said cropped video signal, wherein (i) said encoder presents said digital video bit-stream and said one or more overscan parameters and (ii) said overscan region is absent from said digital video bit-stream presented by said encoder.

2. The encoder according to claim 1, wherein said second circuit is further configured to:
multiplex said one or more overscan parameters into said digital video bit-stream.

3. The encoder according to claim 1, wherein said encoder is further configured to transmit said one or more overscan parameters outside said digital video bit-stream.

4. The encoder according to claim 1, wherein said one or more overscan parameters define at least one boundary of said overscan region relative to at least one boundary of said picture region.

5. A decoder comprising:
a first circuit configured to generate a decompressed video signal defining a picture region containing image information in response to decompressing a digital video bit-stream received by said decoder; and
a second circuit configured to generate a padded video signal in response to said decompressed video signal and one or more overscan parameters received by said decoder, wherein (i) said padded video signal conveys an image having said picture region and a overscan region, (ii) said one or more overscan parameters describe one or more dimensions of said overscan region and (iii) said overscan region is absent from said digital video bit-stream as received by said decoder.

6. The decoder according to claim 5, wherein said first circuit is further configured to:
extract said one or more overscan parameters from said digital video bit-stream.

7. The decoder according to claim 5, wherein said second circuit is further configured to:
generate pixel data in said overscan region in response to one or more images reconstructed from said digital video bit-stream.

8. The decoder according to claim 7, wherein at least one pixel of said pixel data is copied from at least one of:
a top row of a picture region of said one or more images reconstructed from said digital video bit-stream;
a bottom row of said picture region of said one or more images reconstructed from said digital video bit-stream;
a left-most column of said picture region of said one or more images reconstructed from said digital video bit-stream; and
a right-most column of said picture region of said one or more images reconstructed from said digital video bit-stream.

9. The decoder according to claim 5, wherein said one or more overscan parameters locate at least one boundary of said overscan region relative to at least one boundary said picture region.

10. The encoder according to claim 1, wherein said second circuit is further configured to generate said digital video bit-stream containing compressed image data for said picture region in said image.

11. The encoder according to claim 1, wherein said one or more overscan parameters comprise at least one of:
an overscan flag;
a first value representing a number of rows adjacent a top edge of said picture region;
a second value representing a number of rows adjacent a bottom edge of said picture region;
a third value representing a number of columns adjacent a left edge of said picture region; and
a fourth value representing a number of columns adjacent a right edge of said picture region.

12. The encoder according to claim 1, wherein said digital video bit-stream is H.264 standard compliant and said one or more overscan parameters are sent as part of pan-and-scan fields.

13. The encoder according to claim 2, wherein the one or more overscan parameters are part of a video usability information (VUI) header.

14. The encoder according to claim 1, wherein generating said one or more overscan parameters comprises assigning a value to each of the one or more overscan parameters representing at least one of (i) an offset from an outer edge of the overscan region as measured from a corresponding edge of the picture region and (ii) an offset to an inner edge of the overscan region as measured from a corresponding outer edge of the image.

15. The decoder according to claim 5, wherein:
said first circuit is configured to generate a reconstructed picture region by decoding said image information in said digital video bit-stream; and
said second circuit is configured to generate a reconstructed full image by padding said reconstructed picture region based on said one or more overscan parameters.

16. The decoder according to claim 6, wherein said one or more overscan parameters are part of a video usability information (VUI) header.

17. The decoder according to claim 5, wherein said decoder is configured to receive said one or more overscan parameters separately from said digital video bit-stream.

18. The decoder according to claim 5, wherein said digital video bit-stream is H.264 standard compliant and said overscan parameters are received as part of pan-and-scan fields.

19. A method for compressing and transmitting an image in a bit-stream, comprising the steps of:
(A) selecting between a first mode and a second mode;
(B) extracting a picture region of said image and generating one or more overscan parameters describing one or more dimensions of an overscan region of said image while in said first mode;
(C) compressing said picture region to generate a compressed representation while in said first mode;
(D) compressing said image to generate said compressed representation while in said second mode;
(E) transmitting said compressed representation in said bit-stream while in said second mode; and
(F) transmitting said compressed representation and said one or more overscan parameters in said bit-stream while in said first mode, wherein said overscan region is absent from said bit-stream.

20. The method according to claim 19, wherein said one or more overscan parameters comprise at least one of:
an overscan flag;
a first value representing a number of rows adjacent a top edge of said picture region;
a second value representing a number of rows adjacent a bottom edge of said picture region;
a third value representing a number of columns adjacent a left edge of said picture region; and
a fourth value representing a number of columns adjacent a right edge of said picture region.

21. A method for receiving and decompressing an image in a bit-stream comprising the steps of:
(A) receiving a compressed representation of a picture region of said image and one or more overscan parameters in said bit-stream, wherein said one or more overscan parameters describe one or more dimensions of an overscan region of said image absent from said bit-stream, while in a first mode;
(B) receiving a compressed representation of said image in said bit-stream while in a second mode;
(C) decompressing said compressed representation of said picture region to reconstruct said picture region while in said first mode;
(D) decompressing said compressed representation of said image to reconstruct said image while in said second mode; and
(E) reconstructing said overscan region of said image from said one or more overscan parameters while in said first mode.

22. A method for compressing and storing an image, comprising the steps of:
(A) extracting a picture region of said image from a video signal to generate an extracted part and generating one or more overscan parameters describing an overscan region of said image;
(B) compressing said extracted part to generate a compressed representation;
(C) storing said compressed representation; and
(D) storing said one or more overscan parameters instead of said overscan region of said image, wherein said overscan region is outside said picture region.

23. A method for reading and decompressing an image, comprising the steps of:
(A) reading a compressed representation of a picture region of said image from a storage medium;
(B) reading one or more overscan parameters, wherein said one or more overscan parameters describe one or more dimensions of an overscan region of said image absent from the storage medium;
(C) decompressing said compressed representation to reconstruct said picture region of said image; and
(D) reconstructing said overscan region from said one or more overscan parameters to generate said image.

24. The method of claim 23, wherein said one or more overscan parameters comprise at least one of:
an overscan flag;
a first value representing a number of rows adjacent a top edge of said picture region;
a second value representing a number of rows adjacent a bottom edge of said picture region;
a third value representing a number of columns adjacent a left edge of said picture region; and
a fourth value representing a number of columns adjacent a right edge of said picture region.

* * * * *